No. 760,342. Patented May 17, 1904.

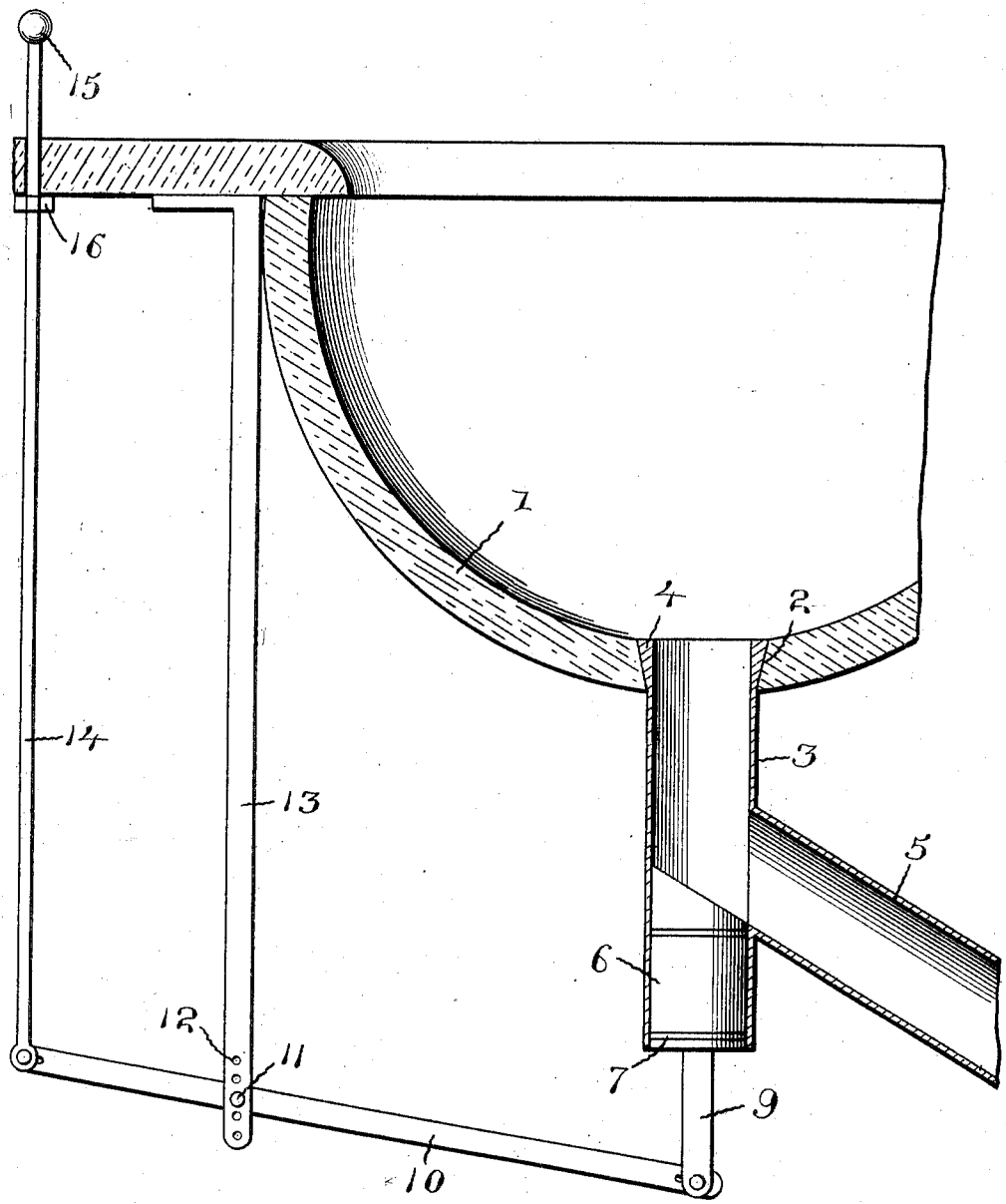

UNITED STATES PATENT OFFICE.

FRANK B. METOSH, OF SAVANNAH, NEW YORK, ASSIGNOR TO EMELINE K. ADRIANCE AND FRANCES METOSH, OF AUBURN, NEW YORK.

WASHBASIN.

SPECIFICATION forming part of Letters Patent No. 760,342, dated May 17, 1904.

Application filed June 3, 1903. Serial No. 159,921. (No model.)

*To all whom it may concern:*

Be it known that I, FRANK B. METOSH, a citizen of the United States, residing at Savannah, in the county of Wayne and State of New York, have invented new and useful Improvements in Washbasins, of which the following is a specification.

My invention relates to new and useful improvements in washbasins, and more particularly to plugs for closing the outlets thereof.

The object of the invention is to employ a plug which can be readily placed within or removed from the outlet without the necessity of placing the hand within the basin.

A further object is to provide a simple and inexpensive device which can be readily attached to an ordinary washbasin and which can be operated by means of a rod located at one side of the basin.

With the above and other objects in view the invention consists in providing an outlet-pipe having a piston slidably mounted therein, the upper end of the piston being beveled so as to aline with the inclined outlet-pipe. The piston is adapted to be operated by means of a lever having a rod extending from one end upward to a point adjacent the piston.

The invention also consists in the further novel construction and combination of parts hereinafter more fully described and claimed, and illustrated in the accompanying drawing, which is a section through a portion of a washbasin having my improved stopper in the outlet thereof.

Referring to the figures by numerals of reference, 1 is a washbasin having an outlet 2, within which is arranged a depending pipe 3, the upper end of which is preferably enlarged, as shown at 4, so as to permit it to be firmly seated within outlet 2. An inclined discharge-pipe 5 extends from one side of pipe 3. Slidably mounted within pipe 3 is a piston 6, having suitable packing 7 arranged therearound to prevent leakage, and the upper or inner end of the piston is beveled, so as to aline with the discharge-pipe 5. A rod 8 extends downward from piston 6 and is connected to one end of a lever 10, fulcrumed upon a pin 11, which may be placed in any one of a series of apertures 12, formed in a hanger 13. The other end of the lever 10 is secured to a rod 14, which is mounted adjacent the piston and is provided with a handle or knob 15. When it is desired to close the pipe 3, the knob 15 is depressed and the lever 10 will therefore move the piston 6 upward, so as to close the pipe 5. In order to discharge the contents of the basin through the pipes 3 and 5, knob 15 is drawn upward and the piston 6 is therefore carried downward until the upper end thereof is brought into contact with the lower end of pipe 5. By providing the beveled end of the piston the accumulation of material within the pipe 3 is prevented. Any suitable means, as a nut 16, may be provided for limiting the downward movement of the piston 6.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

The combination with a basin having an outlet; of an outlet-pipe, an enlarged end thereto seated within the outlet, an inclined discharge-pipe extending from the outlet-pipe, a piston within the outlet-pipe, the inner end thereof being shaped to aline with the discharge-pipe, a hanger, a lever adjustably fulcrumed thereto and connected to the piston, and a rod for operating the lever.

In testimony whereof I affix my signature in presence of two witnesses.

FRANK B. METOSH.

Witnesses:
BERT REED,
A. W. WHITBECK.